T. M. BYRNES.
SPINNING SPINDLE.
APPLICATION FILED APR. 6, 1908.

906,197.

Patented Dec. 8, 1908.

WITNESSES:
H. L. Sprague
R. M. Mowry

INVENTOR.
Thomas M. Byrnes,
BY
ATTORNEY.

UNITED STATES PATENT OFFICE.

THOMAS M. BYRNES, OF CHICOPEE, MASSACHUSETTS.

SPINNING-SPINDLE.

No. 906,197.     Specification of Letters Patent.     Patented Dec. 8, 1908.

Application filed April 6, 1908. Serial No. 425,381.

*To all whom it may concern:*

Be it known that I, THOMAS M. BYRNES, a citizen of the United States of America, and resident of Chicopee, in the county of Hampden and State of Massachusetts, have invented certain new and useful Improvements in Spinning-Spindles, of which the following is a full, clear, and exact description.

This invention for improvements in spinning spindles, consists in certain new combinations and arrangements of parts, and the constructions of certain of the parts, as shown in the accompanying drawings, below described, and set forth in the claims, for the attainment of advantages which will be hereinafter rendered apparent.

Figure 1:
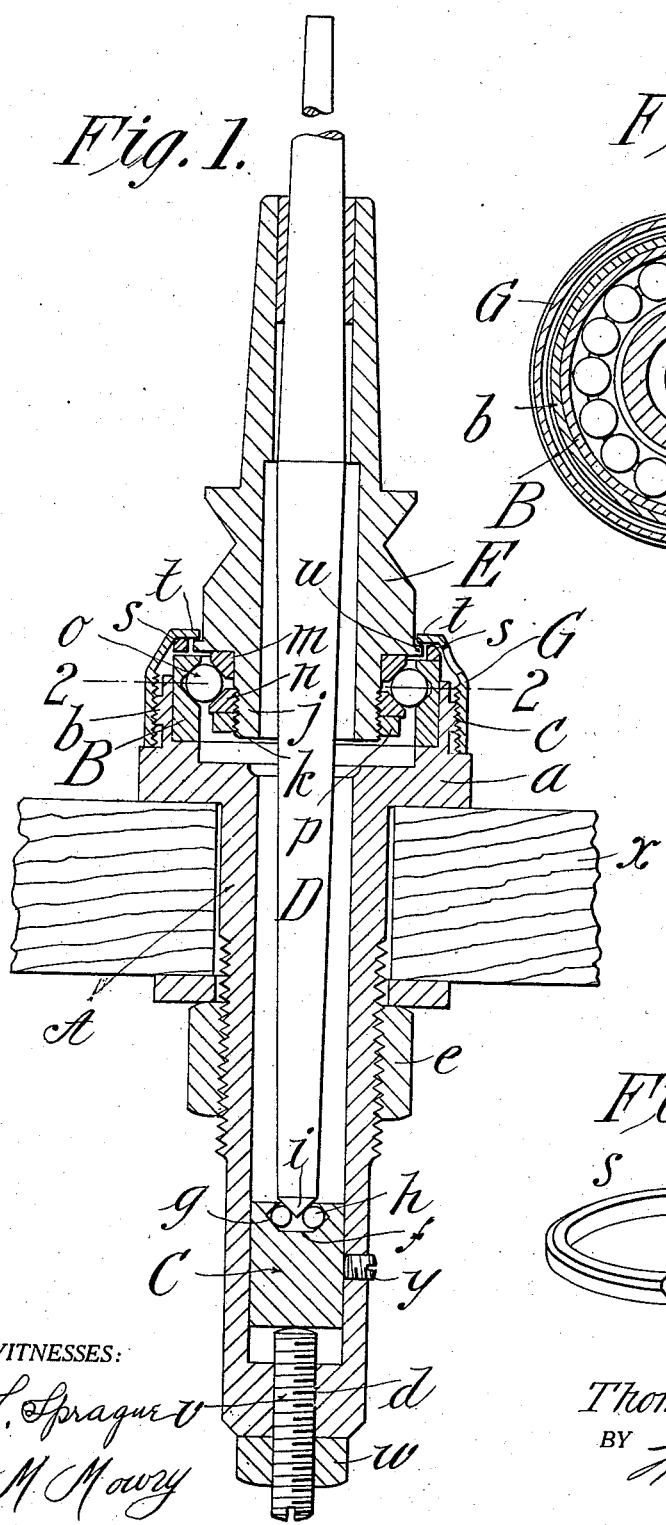
Figure 2:
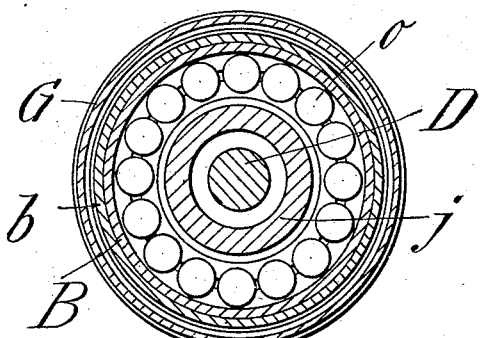
Figure 3:
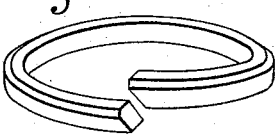

In the drawings:—Figure 1 is an enlarged central vertical sectional view, on an enlarged scale, of the spindle. Fig. 2 is a horizontal cross section on line 2—2, Fig. 1. Fig. 3 is a perspective view of a form of spring operatively included in the spindle devices.

Similar characters of reference denote corresponding parts in all of the views.

In the drawings,—A represents a bolster of a general tubular form, but constructed as of an enlarged and upwardly open cup-shape at its upper portion as constituted by the circular enlargement $a$ and the upstanding annular flange $b$ provided with the external screw threads $c$. The bolster is adapted to be supported on the rail $x$ in a usual manner and held in place by the nut $e$. The tubular lower portion of the bolster is closed excepting for an axial threaded opening $d$ therethrough.

B represents an internally grooved ball-race-ring closely, but loosely fitted within the upper cup-shape portion of the bolster. In the lower portion of the bolster is provided a step for the spindle constituted by the cylindrical vertically adjustable block C having within its upper end a circular aperture $f$ having its surrounding wall made in the form of a V-groove $g$ and provided therewithin with a series of small balls $h$ supported on which is the lower conical end $i$ of the spindle D which at an intermediate portion thereof has, as a unitary part thereof, the whirl E. The lower portion of the said whirl is in the form of an axially extending hub $j$ of reduced diameter and provided with screw threads $k$ at the lower portion thereof. A cone ring $m$ is affixed on the plain or non-threaded upper portion of said hub, while another cone ring $n$ internally screw threaded is engaged on the threaded portion of the hub and locked in its adjustment relatively to the balls $o$ interposed between the cone ring and the race ring B, by the ring nut $p$.

G represents an annular shell, having not only the function of a dust cap or guard for the ball bearing devices of the spindle but also a means for retaining the spring ring $s$ in its proper place for a purpose hereinafter particularly noted,—internally screw threaded and engaged on the cup-shaped upper part of the bolster and upwardly and inwardly extending thereabove, and also having at its upper portion an inwardly extending annular flange $t$ which overlies the top of the aforementioned loosely fitting ball-race-ring B with a degree of separation therefrom and engages, with an overlapping relation over the external annular flange $u$ at the base of the whirl,—that is adjacent the junction of the whirl proper with its hub-like depending extension $j$.

It is to be particularly noted that the split ring $s$ which is in substance a single convolution of a spiral spring, is interposed under a suitable degree of compression, and for spring reaction between the dust cap flange $t$ and the upper edge of the ball-race-ring B. This spring split ring $s$ is operative to exert a pressure parallel with the axis of the spindle and against the ball-race-ring, thereby insuring that such ring will be held in its place at the base of the cup in the bolster in which it is loosely fitted with a yielding pressure, with the capability, however, to gradually creep around as induced by the swiftly revolving whirl through the anti-friction balls; and thus any tendency of the whirl and spindle to have an oscillatory motion or gyration due to the draft of the driving band will be without effect to wear the race ring more at one side thereof than the other, as would be the case if such ring were immovably embedded in the bolster.

The spindle step C is vertically adjusted by the screw plug $v$ threading through the screw threaded axial hole in the otherwise closed bottom of the tubular bolster, said plug being locked when the parts are properly adjusted by the binding nut $w$ and the step is also locked by the transversely applied set screw $y$. This spindle in addition to its functional advantages is also superior from the practicability of construction, inexpensively, of its comparatively few simple and easily produced elements.

I claim:—

1. In a spindle, in combination, a bolster constructed of cup-shape at its upper portion, and a ball-race-ring loosely fitted in said cup shaped bolster portion, a spindle, having a whirl constructed at its lower part with a hub or portion of reduced diameter located within the said race-ring in said portion of the bolster and having a ball groove in which, and in the proximate groove of said ring, are a series of balls, and a spring operative against the said ring for forcing it with a pressure against, but not immovably relatively to, the cup shaped portion of the bolster.

2. In a spindle, in combination, a tubular bolster constructed with a circularly widened upper portion having an annular upstanding flange externally screw threaded, a ball-race-ring loosely fitted within said annular flange and resting on the circularly widened upper portion of the bolster, a spindle, having a whirl constructed with hub or portion of reduced diameter located within the said race-ring in the cup shaped portion of the bolster and having a ball groove in which, and in the proximate groove of said ring, are a series of balls, a shell screw engaged about said externally threaded upstanding annular flange and having an inwardly extending annular flange located above the upper edge of said ball-race-ring, and a spring between said latter named flange and the top of the race ring.

3. In a spindle, in combination, a bolster constructed of cup shape and externally screw threaded at its upper portion, having a ball-race-ring loosely fitted in said cup-shaped bolster portion, a spindle having a whirl which is constructed at its lower part with an outwardly extending flange and below such flange with a hub-like portion of reduced diameter, located within the said race-ring and having a ball groove oppositely related to the groove in said ring, and the interposed balls, a shell internally screw threaded and engaged with the external screw threads of the upper portion of the bolster and having at its upper portion an inwardly extending annular flange having an overlapping relation with the aforementioned flange on the whirl, and a spring ring interposed and reacting between the inwardly extending flange of said shell and the upper edge of the ball-race-ring.

4. In a spindle, in combination, a tubular bolster having a diametrically enlarged cup-shaped upper portion, and a spindle stepped in said bolster and having a whirl, the lower portion of which is in the form of a hub of reduced diameter and screw threaded, a ring fitted in the cup-shaped upper portion of the bolster having an internal ball groove, a cone ring on the upper part of the said hub-like portion of the whirl, an internally threaded cone ring screw engaged on the threaded part of said hub-like portion, a ring nut also screw engaged on said hub-like part for confinement against the screw engaged cone ring, the interposed balls, and means for preventing the displacement of the ball-race-ring from its position in the cup-shaped portion of the bolster.

5. In a spindle, in combination, a tubular bolster having a diametrically enlarged externally screw threaded cup-shaped upper portion, and a spindle stepped in said bolster and having a whirl, provided with an outwardly extending flange and with an extension therebelow in the form of an axial hub of reduced diameter and screw threaded, a ring loosely fitted in the cup-shaped upper portion of the bolster having an internal ball groove, a cone ring affixed on the upper part of the said hub-like portion of the whirl, an internally threaded cone ring screw engaged on the threaded part of said hub-like portion, a ring nut also screw engaged on said hub-like part for confinement against the screw engaged cone ring, the interposed balls, an internally threaded shell, screw engaged about said cup shaped upper portion of the bolster, and having an internal flange at its upper part overlapped over the outwardly extending flange of the whirl and having its location above the top of the ball race ring, and a spring ring interposed and reacting between said internal flange of the shell and the upper edge of the ball-race-ring.

6. In a spinning spindle, in combination, a bolster of tubular form, and made of an enlarged cup shape with external screw threads at its upper portion, and having an internally grooved ball-race-ring loosely fitted therein, a cylindrical block vertically adjustable in the lower end of the tubular bolster having within its upper end a circular aperture having its wall grooved and provided with a series of balls therein, means for vertically adjusting said cylindrical block, and a spindle having its lower end of conical form and in bearing, on the balls in said vertically adjustable cylindrical block, and having a whirl the lower portion of which is in the form of a hub of reduced diameter and screw threaded, a cone ring affixed on the upper part of said hub, another cone ring internally screw threaded and engaged on the hub, a ring nut also screw engaged on the hub and for confining the threaded cone ring, the balls interposed between said cone ring and the race ring, an annular member screw engaged on the cup-shaped upper part of the bolster and upwardly extending thereabove and having an inwardly extending annular flange, and a spring ring between such flange and the top of the race ring.

Signed by me at Springfield, Mass., in presence of two subscribing witnesses.

THOMAS M. BYRNES.

Witnesses:
G. R. DRISCOLL,
WM. S. BELLOWS.